United States Patent [19]

Muraviev et al.

[11] 4,372,151
[45] Feb. 8, 1983

[54] AUTOMATIC FAULT LOCATING APPARATUS FOR A PRESSURIZED PIPELINE

[76] Inventors: Gennady A. Muraviev, Keskuse, 20, kv. 20, Tallin; Lev B. Kublanovsky, Festivalnaya, 31, kv. 63, Moscow, both of U.S.S.R.

[21] Appl. No.: 216,999
[22] PCT Filed: Mar. 13, 1980
[86] PCT No.: PCT/SU80/00049
 § 371 Date: Nov. 13, 1980
 § 102(e) Date: Nov. 13, 1980
[87] PCT Pub. No.: WO80/01942
 PCT Pub. Date: Sep. 18, 1980

[30] Foreign Application Priority Data

Mar. 13, 1979 [SU] U.S.S.R. ............... 2729652

[51] Int. Cl.³ ............................. G01M 3/24
[52] U.S. Cl. ............................. 73/40.5 A
[58] Field of Search ........... 73/40.5 A, 40.5 R

[56] References Cited

U.S. PATENT DOCUMENTS

| | | | |
|---|---|---|---|
| 3,264,864 | 8/1966 | Reid et al. | 73/40.5 A X |
| 3,851,521 | 12/1974 | Ottenstein | 73/40.5 R |
| 3,930,556 | 1/1976 | Kusuda et al. | 73/40.5 A |
| 4,083,229 | 4/1978 | Anway | 73/40.5 A |
| 4,289,019 | 9/1981 | Claytor | 73/40.5 A |

FOREIGN PATENT DOCUMENTS 136416 10/1979 Japan .............. 73/40.5 A

Primary Examiner—Charles A. Ruehl
Assistant Examiner—Joseph W. Roskos
Attorney, Agent, or Firm—Robert E. Burns; Emmanuel J. Lobato; Bruce L. Adams

[57] ABSTRACT

An automatic fault locating apparatus for a pressurized pipeline comprises a pick-up (1) having its output electrically associated with an input of an amplifier (6) whose output is connected to one of inputs of an AND gate (7) having its other input connected to a pulse generator (8) whereas an output of the AND gate (7) is connected to an input of a pulse counter (9). The apparatus further comprises an integration unit (2) having an input connected to the output of the pick-up (1) an amplitude limiter (3) having its signal input connected to an output of the integration unit (2), a limit level adjusting unit (4) whose output is connected to a control input of the amplitude limiter (3), a differentiation unit (5) having its input connected to an output of the amplitude limiter (3), whereas an output thereof is connected to an input of the amplifier (6).

3 Claims, 10 Drawing Figures

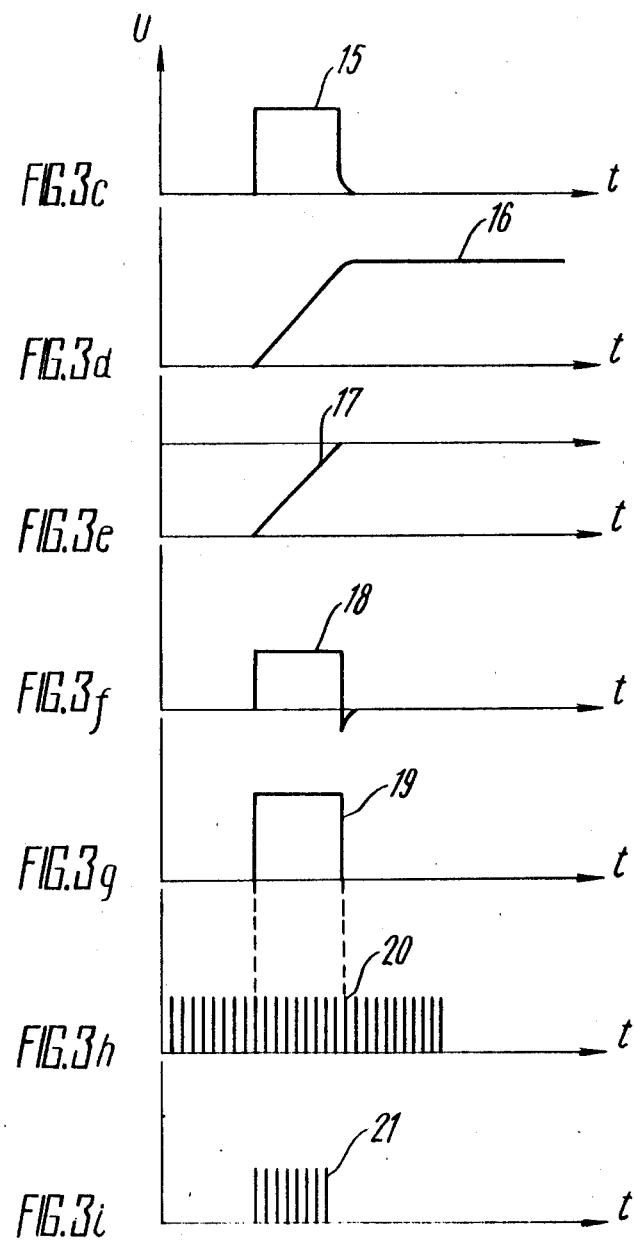

AUTOMATIC FAULT LOCATING APPARATUS FOR A PRESSURIZED PIPELINE

FIELD OF THE INVENTION

The present invention relates to fault locating apparatus, and more particularly, to automatic fault locating apparatus for a pressurized pipeline.

BACKGROUND OF THE INVENTION

Commonly fluids flowing through transmission and distribution lines because of leaks or faults escape from such lines, and the presence and location of such faults or leaks should be quickly and precisely determined in order to reduce the fluid loss.

Various apparatus have been developed for locating a fault in a pressurized pipeline.

Known in the prior art are apparatus based on detection of acoustic oscillations produced in a fault area of the pipeline and propagating at the speed of sound in the fluid products being pumped to the ends of the damaged pipeline.

There is known a fault locating apparatus for a pressurized pipeline, comprising a transducer intended for conversion of mechanical oscillation into an electrical signal, an amplifier, a converter of signals into their ratio, and an indicator, connected in series (cf. USSR Inventor's Certificate No. 603,804 published Apr. 25, 1978).

This apparatus possesses low expedition properties since a considerable time is required to determine the fault location as it is first necessary to define the route of the pipeline being inspected and further to go all over the pipeline route.

The apparatus also does not possess an adequate noise immunity. As a result, it does not allow the fault location to be determined reliably in pipelines laid in regions with a high level of environmental acoustic noise (for example, in the boundaries of a city, in the neighbourhood of reilway crossings, main highway crossings, industrial enterprises, airplane traffic routes). This is explained by the fact that in these regions the environmental noise is often considerably higher than the noise produced by a fault, and the transducer does not distinguish the useful acoustic oscillation from the background one.

The noise immunity of the apparatus can be improved by placing it directly within the pipeline to be inspected.

Known in the prior art is a fault locating apparatus for a pressurized pipeline, comprising a movable pipeline pig having at least two resilient cups isolating one compartment therebetween wherein the electrical and recording portions of the apparatus are carried (cf. U.S. Pat. No. 3,413,653, patented on Nov. 26, 1968).

In order to locate the fault, the apparatus in question is placed inside the pipeline, the recording portion recording output signals of the electrical portion. Then the apparatus is withdrawn from the pipeline, and the records are processed.

However, this apparatus possesses low expedition properties since the data are recorded on a magnetic tape that is to be withdrawn from the pipeline and processed. As a result, a considerable time is required to detect a pipeline fault.

There is also known a fault locating apparatus for a pressurized pipeline, comprising two measuring channels including each a transducer intended for conversion of mechanical oscillation into electrical signals and having an output connected to an amplifier, amplifier outputs being associated with an indicator that is a loop oscillograph (cf. USSR Inventor's Certificate No. 327,425 patented on Jan. 26, 1972).

For the purpose of fault detection, the transducers are installed on the pipeline body at the beginning and at the end of the pressure pipeline portion to be inspected.

The acoustic waves caused by a pipeline fault propagate from the fault area at the speed of sound, the transducers convert these waves into electrical signals recorded on a single oscillogram by the oscillograph loops.

The oscillograms are then visually processed to determine and to measure phase shifts between typical peaks of the acoustic waves and the fault is located by measuring the phase shift between the acoustic waves.

However, the visual processing of the data recorded by the oscillograph lowers the accuracy of the acoustic wave phase shift determination, and, as a result, it brings about a considerable error in fault location.

Furthermore, the apparatus mentioned above has a low speed of operation due to the fact that oscillograms recorded by the oscillograph are processed manually.

Moreover, all of the apparatus discussed hereinabove do not allow to determine large-size breaks and ruptures as well as to keep the pipeline under a constant supervision since the first requires to move along the pipeline to be inspected, the second requires to place the apparatus inside the pipeline and to withdraw it therefrom, while the third requires that the data be manually processed.

Known in the prior art are fault locating apparatus whose principle of operation is based on the detection of the pressure fall wave produced in the fault area and propagating together with the pumped products along the pipeline.

There is known an automatic fault locating apparatus comprising two pick-ups responsive to the pressure drop wave produced in the fault area and propagating together with the pumped product along the pipeline. Pick-up outputs are connected to a time-interval counter (cf. USSR Inventor's Certificate No. 191,284 patented on Jan. 14, 1967).

In order to determine the fault location, the pick-ups are installed on the opposite ends of the pressurized pipeline portion to be checked. The pulse of the pick-up that is nearer to the fault point will reach the time-interval counter earlier than the pulse of the pick-up that is farther from the fault point. The time the fault happens in the pipeline is determined from the response time of the pick-up that is nearer to the damage place, whereas the fault is located by measuring the difference between the pick-up response times.

This apparatus allows to determine large-size faults and ruptures as well as to keep the pressurized pipeline under a constant supervision.

However, this apparatus possesses a low sensitivity and a low noise immunity caused by the susceptibility to service pressure variations.

Known in the prior art is an automatic fault locating apparatus for a pressurized pipeline, comprising pressure pick-ups (cf. USSR Inventor's Certificate No. 478,211 published on July 7, 1975).

An output of each pressure pick-up is connected to a respective amplifier having its output connected to a respective slope and amplitude selector. An output of one of the selectors is connected via a shaper, a communication line and a noise suppressor to one of the inputs of a reading direction indication unit whose other input is connected to another selector. An output of the reading direction indication unit is connected to one of the inputs of a distance-to-fault point indicator whose other input is connected to a setting generator. An output of the distance-to-fault point indicator is connected to an input of a false information reset unit having an output connected to control inputs of the reading direction indication unit and of the distance-to-fault point indicator.

In the event of a pipeline wall rupture the pressure drop wave propagates in both directions from the rupture area and affects alternately on the pressure pick-ups. The reading direction indication unit indicates the sequence in which pick-up pulses come through respective units. When operating, the reading direction indication unit turns on the distance-to-fault point indicator counting the time elapsed between pick-up pulses with the aid of the generator that is a unit time setting device.

This apparatus has a higher sensitivity and noise immunity.

However, this apparatus has a low control accuracy.

There is known an automatic fault locating apparatus for a pressurized pipeline, comprising a receiving unit, a pick-up, an amplifier, a selector, an AND gate, a pulse counter and a pulse generator whose output is connected to an input of the AND gate, all elements being connected in series, and a transmitting unit including a pick-up, an amplifier, a selector, all elements being connected in series and associated through a communication line with the input of the AND gate (cf. USSR Inventor's Certificate No. 589,550 published on Feb. 25, 1978).

The receiving unit further comprises a low-pass filter, a bandpass filter and a shaper, while the transmitting unit further comprises an audio-frequency generator, a bandpass filter and a low-pass filter.

In the event of a pressurized pipeline wall rupture, the pressure drop wave propagates from the rupture area and reaches alternately the receiving unit and the transmitting unit, affecting the pick-ups generating electrical signals fed from the pick-up outputs through the amplifiers to the selectors.

The selected signal of the receiving unit or the communication line signal turns on the AND gate providing the passage of the generator pulses to the pulse counter.

The low-pass filters prevent the passage of this signal to the operating communication equipment, whereas the bandpass filters prevent the passage of working frequencies of the communication equipment to the receiving and transmitting units.

A higher control accuracy is inherent in this apparatus.

However, the necessary use of a special communication line between the receiving unit and the transmitting unit lowers the apparatus reliability due to false signals caused by stray pickups of the communication line, makes the operation of this apparatus more expensive and complicated.

SUMMARY OF THE INVENTION

The present invention has as its aim the provision of such an automatic fault locating apparatus for a pressurized pipeline, that will make it possible to measure the distance to the fault point with the use of only one pick-up mounted on the inspected pipeline, thus reducing noise level in the measuring channel and increasing the apparatus reliability.

With this principal object in view, there is provided an automatic leak locating apparatus for a pressurized pipeline, comprising a pick-up having an output electrically associated with an input of an amplifier having its output connected to one of inputs of an AND gate having the other input connected to a pulse generator whereas an output of the AND gate is connected to an input of a pulse counter. The apparatus is further provided with an integration unit having an input connected to an in-put of the pick-up, an amplitude limiter having a signal input connected to an output of the integration unit, a limit level adjusting unit whose output is connected to a control input of the amplitude limiter, a differentiation unit having an input connected to an output of the amplitude limiter, whereas an output thereof is coupled with an input of the amplifier.

Due to the use of the integration unit, the amplitude limiter, the limit level adjusting unit and the differentiation unit, the possibility exists of measuring the duration of leading edge of the pressure drop wave produced in the pipeline fault area and of determining the distance to the fault point, using a single pick-up installed on the pipeline, thus improving the apparatus reliability.

It is advisable to use a pick-up responsive to the duration of the leading edge of the pressure drop wave produced in the pipeline fault area.

It is also advisable that the apparatus be further provided with an alarm having an input connected to the AND gate.

The use of the alarm having its input connected to the AND gate provides sound signals when a fault appears in the pressurized pipeline, allowing the fault location to be determined more quickly.

The present invention will become fully apparent from the following description taken in conjunction with the accompanying drawings, wherein:

BRIEF DESCRIPTION OF THE DRAWINGS

FIGS. 3c through 3i are waveforms illustrating the operation of the apparatus shown in FIG. 1.

DESCRIPTION OF A PREFERRED EMBODIMENT

Figure 1:
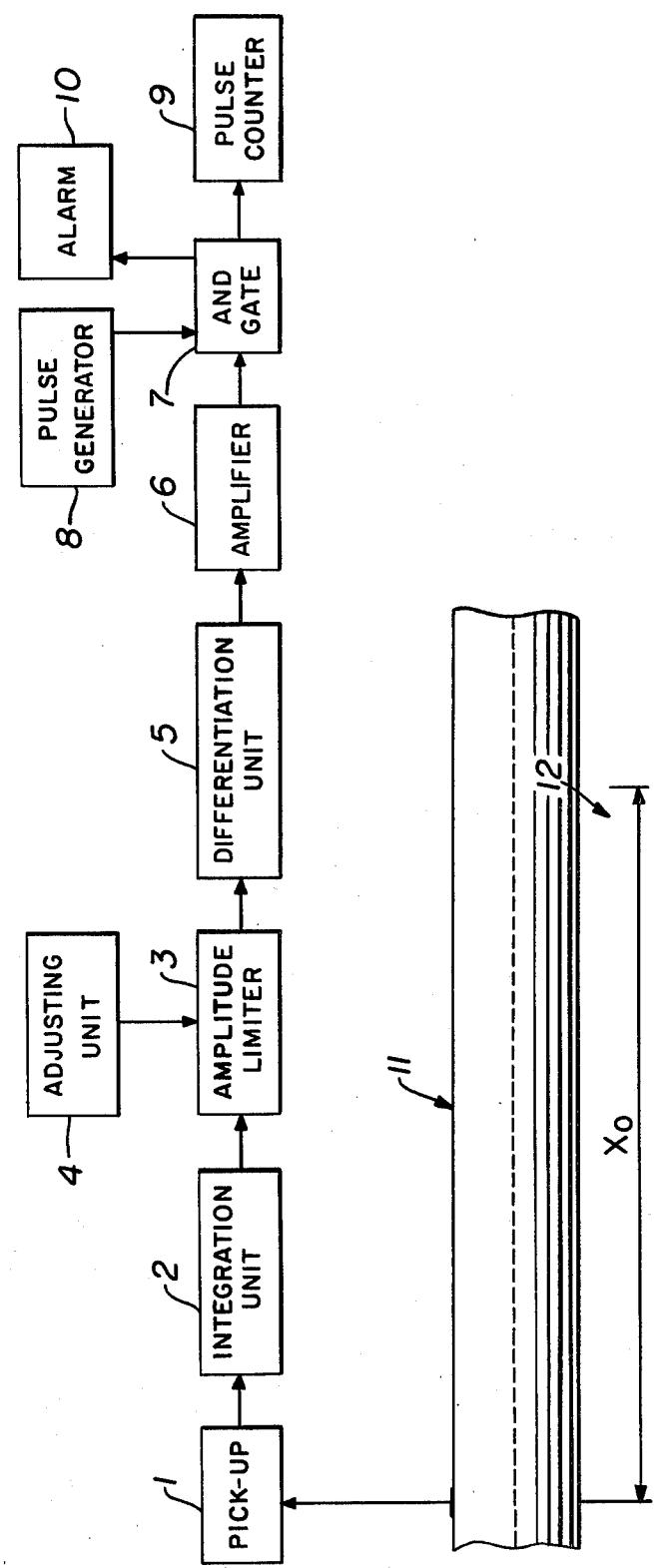
FIG. 1 is a block-diagram of an automatic leak locating apparatus for a pressurized pipeline, in acordance with the present invention.

The automatic leak locating apparatus for a pressurized pipeline comprises a pick-up 1 responsive to the duration of the leading edge of a pressure drop wave. An output of the pick-up 1 is connected to an input of an integration unit 2 having an output connected to a signal input of an amplitude limiter 3 that can be made, for example, as a Schmitt trigger. Connected to a control input of the amplitude limiter 3 is an output of a limit level adjusting unit 4. An output of the amplitude limiter 3 is coupled to a differentiation unit 5 having an output connected to an amplifier 6. An output of the amplifier 6 is connected to one of inputs of an AND gate 7. A pulse generator 8 is connected to the other input of the AND gate 7. One of outputs of the AND gate 7 is coupled with a pulse counter 9, whereas the other output thereof is connected to an alarm means 10.

The frequency of the pulse generator 8 is selected to be equal to a proportionality factor "K" between the duration of leading edge of the pressure drop wave at the limit level and the distance covered thereby, that is constant for a given pipeline. This allows the pulse counter to be graduated directly in length units.

FIG. 1 illustrates schematically a pressurized pipeline 11 to be checked with a fault 12 formed therein.

The proposed apparatus operates in the following manner.

Figure 2A:
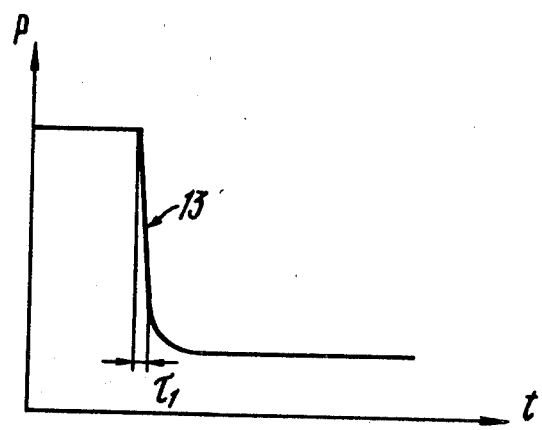
FIGS. 2a, 2b are waveforms illustrating the dependence of the leading edge of pressure drop wave upon time.
Figure 2B:
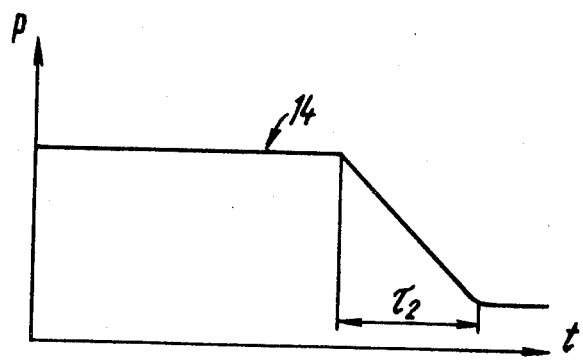

Prior to installing the fault locating apparatus on the pressurized pipeline 11 (FIG. 1) one determines experimentally or by calculations the proportionality factor "K" relating the duration of leading edge of the pressure drop wave at the limit level to the distance covered by the wave. The pick-up 1 is installed on one of the ends of the pipeline 11, and is energized. In case of a fault in the pressurized pipeline 11, a pressure drop wave originating in the fault point starts propagating, with the product being pumped, in both directions from the fault point. The leading edge of the pressure drop wave in the fault area is as represented by a waveform 13 (FIG. 2a) with a very short duration of the leading edge $\tau$ since in the fault area the rate of pressure drop is high. As the pressure drop wave is propagating along the pressurized pipeline 11 (FIG. 1), the duration of leading edge of this wave will be increasing proportionally with the distance covered thereby. When the pressure drop wave comes to the place where the pick-up 1 is installed, it will be as shown by a waveform 14 (FIG. 2b) with a leading edge duration $\tau$. A signal will appear at the output of the pick-up 1, that has a duration equal to the duration of leading edge of the pressure drop wave and is as shown by a waveform 15 (FIG. 3c). From the output of the pick-up 1 (FIG. 1) the signal is applied to the input of the integration unit 2 where the signal is integrated, and a signal shown by a waveform 16 (FIG. 3d) will be produced at the output of the integration unit 2 and applied to the signal input of the amplitude limiter 3. The limit level is established by the limit level adjusting unit 4. A signal shown by a waveform 17 (FIG. 3e) and limited at the set level is applied from the output of the amplitude limiter 3 to the input of the differentiation unit 5. Produced at the output of the differentiation unit 5 is a signal shown by a waveform 18 (FIG. 3f) that is then amplified by the amplifier 6 having a signal at the output thereof that is shown by a waveform 19 (FIG. 3g) with a duration that is equal to the duration of leading edge of the pressure drop wave sensed by the pick-up 1 (FIG. 1). From the output of the amplifier 6 the signal is applied to one of the inputs of the AND gate 7. The other input of the AND gate 7 is continuously supplied with pulses of the pulse generator 8 whose frequency is selected to be equal to the proportionality factor "K" determined for this pressurized pipeline as the relationship between the duration of leading edge of the pressure drop wave at the limit level and the distance covered thereby.

A waveform 20 (FIG. 3h) represents output pulses of the pulse generator 8 (FIG. 1).

When the output signal of the amplifier 6 is applied to the input of the AND gate 7, the AND gate 7 enables the application of pulses from the pulse generator 8 to the pulse counter 9 and turns on the alarm unit 10 that generates sound signals indicating pipeline fault.

After the application of the output signals of the amplifier 6 to the input of the AND gate 7 is discontinued, the supply of pulses of the pulse generator 8 to the pulse counter 9 is ceased.

As a result, a pulse train represented by a waveform 21 (FIG. 3i) is applied to the digital pulse counter 9, and the pulse counter 9 indicates the distance $X_o$ from the place where the pick-up 1 is installed (FIG. 1) to the fault point 12 of the pipeline 11, that is given by $$X_o = K \cdot \tau$$

where
$X_o$—distance from the place where the pick-up is installed to the fault point along the pipeline axis;
K—proportionality factor between the duration of leading edge of the pressure drop wave at the limit value and the distance covered by the wave;
$\tau$—duration of leading edge of the pressure drop wave as sensed by the apparatus pick-up.

The duration of leading edge of the pressure drop wave in the fault area, $\tau_1$ (FIG. 2a), may be neglected due to its small value or a correction may be introduced into the final result to take into account the average static value of the duration of leading edge of the pressure drop wave in the fault area.

EXAMPLE

A pick-up sensitive to the duration of leading edge of the pressure drop wave caused in the fault area of the pipeline is installed on the pressure pipeline under supervision.

| | |
|---|---|
| Length of the pressurized pipeline under supervision, 1 | 82 km |
| Proportionality factor between duration of leading edge of the pressure drop wave at limit level and distance covered by the wave, for this pressurized pipeline, "K" | 348.48 |
| Duration of the leading edge of the pressure drop wave as sensed by the apparatus pick-up, $\tau$ | 0.136 s |

The distance from the place where the apparatus pick-up is installed to the fault area, along the pipeline axis will be:

$$X_o = K\tau = 348.48 \times 0.136 = 47.39 \text{ (km)}$$

While a particular embodiment of the invention has been shown and described, various modifications thereof will be apparent to those skilled in the art and therefore it is not intended that the invention be limited to the disclosed embodiment or to the details thereof and the departures may be made therefrom within the spirit and scope of the invention as defined in the appended claims.

The advantages offered by the present invention stem from the fact that this automatic fault locating apparatus possesses a higher reliability combined with simpler design and operation and a decreased net cost.

Another advantage of the present invention is that the time required to eliminate the emergency is reduced. A still other advantage is a decreased in the environment contamination in case of pumping of toxic products due to the reduction in the time required to eliminate the emergency.

INDUSTRIAL APPLICABILITY

The present invention can find a wide range of application for locating breaches and leaks in transmission and distribution lines used for pumping fluids under pressure. The invention can be most advantageously used for locating large-sized faults and even ruptures in distribution and circulating pipelines.

We claim:

1. An automatic leak locating apparatus for a pressurized pipeline, comprising a pick-up for converting acoustic vibrations due to a leak into electrical signals and having an output electrically associated with an input of an amplifier having its output connected to one of the inputs of an AND gate, the AND gate having its other input connected to a pulse generator, whose frequency is equal to a proportionality factor K corresponding to the duration of a leading edge of a pressure drop level at a limit level and the distance covered thereby, a pulse counter to which an output of the AND gate is connected, characterized in that it further comprises an integration unit (2) to integrate said signals and having an input connected to an output of the pick-up to receive said signals (1), an amplitude limiter (3) having a signal input connected to receive an output of the integration unit (2), a limit level adjusting unit (4) whose output is connected to a control input of the amplitude limiter (3), a differentiation unit (5) having an input connected to receive an output of the amplitude limiter (3), and an output of said differentiation unit being connected as an input to the amplifier (6).

2. An apparatus as defined in claim 1, characterized in that the pick-up (1) is a pick-up disposed to be responsive to the duration of a leading edge of a pressure drop wave produced in a leak point of the pressurized pipeline.

3. An apparatus as defined in claim 1, characterized in that it further comprises alarm means (10) having an input connected from the AND gate (7) to indicate acoustically existence of a leak.

* * * * *